United States Patent
Kohinata et al.

(10) Patent No.: US 9,587,112 B2
(45) Date of Patent: Mar. 7, 2017

(54) AROMATIC POLYSULFONE RESIN AND MEMBRANES THEREOF

(75) Inventors: Yusaku Kohinata, Tokyo (JP); Hiroshi Harada, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 426 days.

(21) Appl. No.: 13/498,877

(22) PCT Filed: Sep. 14, 2010

(86) PCT No.: PCT/JP2010/065808
§ 371 (c)(1),
(2), (4) Date: Mar. 28, 2012

(87) PCT Pub. No.: WO2011/040229
PCT Pub. Date: Apr. 7, 2011

(65) Prior Publication Data
US 2012/0190764 A1  Jul. 26, 2012

(30) Foreign Application Priority Data
Sep. 29, 2009  (JP) ................................. 2009-224273

(51) Int. Cl.
    C08G 75/20   (2016.01)
    C08L 81/06   (2006.01)
    B01D 67/00   (2006.01)
    B01D 69/02   (2006.01)
    B01D 71/68   (2006.01)
    C08J 5/18    (2006.01)

(52) U.S. Cl.
    CPC .......... C08L 81/06 (2013.01); B01D 67/0009 (2013.01); B01D 67/0095 (2013.01); B01D 69/02 (2013.01); B01D 71/68 (2013.01); C08J 5/18 (2013.01); B01D 2323/34 (2013.01); B01D 2325/20 (2013.01); C08J 2381/06 (2013.01)

(58) Field of Classification Search
    CPC ......... C08J 5/18; C08J 2381/06; C08L 81/06; B01D 67/0009; B01D 67/0095; B01D 69/02; B01D 71/68; B01D 2323/34; B01D 2325/20
    USPC ........ 210/500.27, 500.41; 521/180; 528/171, 528/373, 390, 391
    See application file for complete search history.

(56) References Cited

U.S. PATENT DOCUMENTS

| 4,755,556 A | 7/1988 | Harris et al. |
| 5,273,657 A * | 12/1993 | Nakashima et al. .......... 210/640 |
| 5,885,456 A | 3/1999 | Charkoudian et al. |
| 2011/0174728 A1* | 7/2011 | Eisen et al. .............. 210/500.21 |

FOREIGN PATENT DOCUMENTS

| EP | 1 693 419 A1 | 8/2006 |
| JP | 61-164602 | 7/1986 |
| JP | 62-502406 | 9/1987 |
| JP | 62-502407 | 9/1987 |
| JP | 10-137565 | 5/1998 |
| JP | 2002-172675 A | 6/2002 |
| JP | 2002-525406 A | 8/2002 |
| JP | 2006-230459 | 9/2006 |
| JP | 2007-530763 A | 11/2007 |
| JP | 2008-285661 A | 11/2008 |
| WO | WO 86/04905 | 8/1986 |
| WO | WO-00/18824 A1 | 4/2000 |
| WO | WO-2005/095491 A1 | 10/2005 |

OTHER PUBLICATIONS

Sumitomo Chemical, Grade line-up for SUMIKAEXCEL PES, 2016.*
First Office Action Chinese Patent Application No. 201080040580.7 dated Apr. 19, 2013.
Chinese Office Action dated Jun. 9, 2014 issued in Application No. 201080040580.7.
Japanese Office Action dated May 20, 2014 issued in Application No. 2010-204071.
International Search Report in PCT/JP2010/065808 dated Dec. 14, 2010.
Second Office Action received in Chinese Application No. 201080040580.7 mailed on Nov. 13, 2013.
Senoo et al., "Basic Polymer Chemistry," 10th Printing of the 1st Edition, Kyoritsu Shuppan Co., Ltd., p. 107 (Sep. 25, 2008) (with partial English-language translation).
Written Patent Opposition issued in Japanese Opposition No. 2015-700110 for Japanese Patent No. 5703645, dated Nov. 9, 2015.

* cited by examiner

Primary Examiner — Irina S Zemel
(74) Attorney, Agent, or Firm — Foley & Lardner LLP

(57) ABSTRACT

According to the present invention, an aromatic polysulfone resin is offered which is suitable as film material, especially in porous membranes. The aromatic polysulfone resin of the present invention has a reduced viscosity of 0.55-0.65 dL/g, and preferably 0.58-0.62 dL/g, number average molecular weight (Mn) of 22000 or more, and preferably 23500 or more, and a value of the ratio of weight average molecular weight (Mw) relative to number average molecular weight (Mn) of 2.54 or less, and preferably 2.50 or less.

12 Claims, No Drawings

AROMATIC POLYSULFONE RESIN AND MEMBRANES THEREOF

TECHNICAL FIELD

The present invention relates to aromatic polysulfone resin that is suitable as film material, and film that is constituted using this.

Priority is claimed to Japanese Patent Application No. 2009-224273, filed Sep. 29, 2009 and to the corresponding PCT application, the contents of which are incorporated herein by reference.

BACKGROUND ART

As aromatic polysulfone resin has excellent heat resistance and chemical resistance, it is used in a variety of applications. One such application is as material of porous membranes used in filtration such as ultrafiltration and microfiltration. For example, JP-2006-230459-A (Patent Document 1) describes use of aromatic polysulfone resin as material of porous hollow-fiber membrane, and specifically presents an example of a porous hollow-fiber membrane using aromatic polysulfone resin which has a reduced viscosity of 0.36, 0.48, or 0.52.

CITATION LIST

Patent Documents

Patent Document 1: JP-2006-230459-A

DISCLOSURE OF INVENTION

Problems to be Solved by the Invention

Porous membranes which experience clogging and reduced filtration efficiency as a result of prolonged use in filtration are usually cleaned by causing backflow of air or water in order to eliminate clogging, but when porous membranes made of conventional aromatic polysulfone resin are subjected to excessive pressure during cleaning, damage such as tears or ruptures may occur, because the toughness of aromatic polysulfone resin is not necessarily sufficient. The purpose of the present invention is to offer aromatic polysulfone resin which is high in toughness, and which is suitable as film material, especially for porous membranes.

Means to Solve the Problems

In order to achieve the foregoing objective, the present invention offers aromatic polysulfone resin, wherein reduced viscosity is 0.55-0.65 dL/g, number average molecular weight (Mn) is 22000 or more, and the value of the ratio of weight average molecular weight (Mw) relative to number average molecular weight (Mn) is 2.54 or less. In addition, according to the present invention, film which contains the aforementioned aromatic polysulfone resin is also offered.

The present invention relates to the following [1]-[4].

[1] Aromatic polysulfone resin, wherein reduced viscosity is 0.55-0.65 dL/g, number average molecular weight (Mn) is 22000 or more, and a value of the ratio (Mw/Mn) of weight average molecular weight (Mw) relative to number average molecular weight (Mn) is 2.54 or less.

[2] The aromatic polysulfone resin according to [1], having a repeating unit represented by the following formula (1).

$$\text{-Ph}^1\text{-SO}_2\text{-Ph}^2\text{-O}— \tag{1}$$

$Ph^1$ and $Ph^2$ each independently represents a phenylene group. Hydrogen atoms of the aforementioned phenylene groups may each be independently substituted with an alkyl group, an aryl group, or a halogen atom.)

[3] Film comprising the aromatic polysulfone resin according to [1] or [2].

[4] The film according to [3], which is a porous membrane.

Effect of the Invention

As the aromatic polysulfone resin of the present invention is high in toughness, it may be suitably used as film material, especially for porous membranes.

MODE FOR CARRYING OUT THE INVENTION

Aromatic polysulfone resin is resin which has a repeating unit including a bivalent aromatic group (the residual group constituted by removing two hydrogen atoms bound to an aromatic ring from an aromatic compound) and a sulfonyl group ($—SO_2—$). From the standpoints of heat resistance and chemical resistance, it is preferable that the repeating unit of the aromatic polysulfone resin of the present invention be the repeating unit represented by the formula (1) below (hereinafter sometimes referred to as "repeating unit (1)"), and it may also have other repeating units such as the repeating unit represented by the formula (2) below (hereinafter sometimes referred to as "repeating unit (2)") or the repeating unit represented by the formula (3) below (hereinafter sometimes referred to as "repeating unit (3)"). The aromatic polysulfone resin of the present invention preferably contains 50-100 mol %, and more preferably 80-100 mol %, of the repeating unit (1) relative to the total of all repeating units.

$$\text{-Ph}^1\text{-SO}_2\text{-Ph}^2\text{-O}— \tag{1}$$

$Ph^1$ and $Ph^2$ each independently represents a phenylene group. Hydrogen atoms of the aforementioned phenylene groups may each be independently substituted with an alkyl group, an aryl group, or a halogen atom.

$$\text{-Ph}^3\text{-R-Ph}^4\text{-O}— \tag{2}$$

$Ph^3$ and $Ph^4$ each independently represents a phenylene group. Hydrogen atoms of the aforementioned phenylene groups may each be independently substituted with an alkyl group, an aryl group, or a halogen atom. R represents an alkylidene group, an oxygen atom, or a sulfur atom.

$$(\text{-Ph}^5)_n\text{—O}— \tag{3}$$

$Ph^5$ represents a phenylene group. Hydrogen atoms of the aforementioned phenylene groups may each be independently substituted with an alkyl group, aryl group, or a halogen atom. n represents an integer from 1-3. In the case where n is 2 or more, the $Ph^5$ which exists in a plurality may be mutually the same or different.

The phenylene group represented by any one of $Ph^1$-$Ph^5$ may be a p-phenylene group, a m-phenylene group, or an o-phenylene group, but a p-phenylene group is preferable. Examples of the alkyl groups which may substitute a hydrogen atom of the aforementioned phenylene groups include a methyl group, an ethyl group, a n-propyl group, an isopropyl group, a n-butyl group, an isobutyl group, a s-butyl group, and a t-butyl group, and the carbon number thereof is usually 1-5. Examples of aryl groups which may substitute a hydrogen atom of the aforementioned phenylene groups include a phenyl group, a 1-naphthyl group, a 2-naphthyl group, and a p-toluyl group, and the carbon number thereof is usually 6-15. Examples of alkylidene groups represented by R, include a methylene group, ethylidene group, isopropylidene group, and 1-butylidene group, and the carbon number thereof is usually 1-5.

The reduced viscosity of the aromatic polysulfone resin of the present invention is 0.55-0.65 dL/g, and preferably 0.58-0.62 dL/g. When reduced viscosity is outside of the aforementioned range, the toughness of the aromatic polysulfone resin is insufficient. Moreover, when reduced viscosity exceeds the aforementioned upper limit, the workability of the aromatic polysulfone resin is insufficient.

The number average molecular weight (Mn) of the aromatic polysulfone resin of the present invention is 22000 or more, and preferably 23500 or more. When Mn does not meet the aforementioned lower limit, the toughness of the aromatic polysulfone resin is insufficient. The upper limit of Mn is to be appropriately adjusted, but from the standpoint of workability of the aromatic polysulfone resin, it is usually 30000, and preferably 27000. That is, the number average molecular weight (Mn) of the aromatic polysulfone resin of the present invention is usually 22000-30000, and preferably 23500-27000.

Furthermore, the value of the ratio (Mw/Mn) of the weight average molecular weight (Mw) relative to the number average molecular weight (Mn) is 2.54 or less, and preferably 2.50 or less. When Mw/Mn exceeds the aforementioned upper limit, the toughness of the aromatic polysulfone resin is insufficient. In addition, the lower limit of Mw/Mn is theoretically 1, and preferably as close as possible to 1.

The aromatic polysulfone resin can be suitably produced by polycondensing corresponding aromatic dihalogenosulfone compounds and aromatic dihydroxy compounds in an organic polar solvent using an alkali metal salt of carbonic acid as the base. For example, a resin having the repeating unit (1) can be suitably produced by using a compound represented by the formula (4) below (hereinafter sometimes referred to as "compound (4)") as the aromatic dihalogenosulfone compound, and by using a compound represented by the formula (5) below (hereinafter sometimes referred to as "compound (5)") as the aromatic dihydroxy compound. In addition, a resin having the repeating unit (1) and the repeating unit (2) can be suitably produced by using the compound (4) as the aromatic dihalogenosulfone compound, and by using a compound represented by the formula (6) below (hereinafter sometimes referred to as "compound (6)") as the aromatic dihydroxy compound. Moreover, a resin having the repeating unit (1) and the repeating unit (3) can be suitably produced by using the compound (4) as the aromatic dihalogenosulfone compound, and a compound represented by the formula (7) below (hereinafter sometimes referred to as "compound (7)") as the aromatic dihydroxy compound.

$X^1$-Ph$^1$-SO$_2$-Ph$^2$-X$^2$     (4)

$X^1$ and $X^2$ each independently represents a halogen atom. Ph$^1$ and Ph$^2$ are as defined above.

HO-Ph$^1$-SO$_2$-Ph$^2$-OH     (5)

Ph$^1$ and Ph$^2$ are as defined above.

HO-Ph$^3$-R-Ph$^4$-OH     (6)

Ph$^3$ and Ph$^4$ and R are as defined above.

HO—(Ph$^5$)$_n$—OH     (7)

Ph$^5$ and n are as defined above.

Examples of the compound (4) include bis(4-chlorophenyl) sulfone and 4-chlorophenyl-3',4'-dichlorophenyl sulfone. Examples of the compound (5) include bis(4-hydroxyphenyl) sulfone, bis(4-hydroxy-3,5-dimethylphenyl) sulfone, and bis(4-hydroxy-3-phenylphenyl) sulfone. Examples of the compound (6) include 2,2-bis(4-hydroxyphenyl)propane, 2,2-bis(4-hydroxyphenyl)hexafluoropropane, bis(4-hydroxyphenyl) sulfide, bis(4-hydroxy-3-methylphenyl) sulfide, and bis(4-hydroxyphenyl) ether. Examples of the compound (7) include hydroquinone, resorcin, catechol, phenylhydroquinone, 4,4'-dihydroxybiphenyl, 2,2'-dihydroxybiphenyl, 3,5,3',5'-tetramethyl-4,4'-dihydroxybiphenyl, 2,2'-diphenyl-4,4'-dihydroxybiphenyl, and 4,4'''-dihydroxy-p-quarterphenyl.

An example of an aromatic dihalogenosulfone compound other than the compound (4) include 4,4'-bis(4-chlorophenylsulfonyl) biphenyl. In addition, in place of all or part of the aromatic dihalogenosulfone compound and/or the aromatic dihydroxy compound, a compound having a halogeno group and a hydroxyl group in the molecule such as 4-hydroxy-4'-(4-chlorophenylsulfonyl) biphenyl may also be used.

The alkali metal salt of carbonic acid may be alkali carbonate which is a normal salt, alkali bicarbonate (hydrogen alkali carbonate) which is an acidic salt, or a mixture thereof. Sodium carbonate and potassium carbonate are preferably used as the alkali carbonate, and sodium bicarbonate and potassium bicarbonate are preferably used as the alkali bicarbonate.

Examples of the organic polar solvent include dimethyl sulfoxide, 1-methyl-2-pyrrolidone, sulfolane(1,1-dioxothilan), 1,3-dimethyl-2-imidazolidinone, 1,3-diethyl-2-imidazolidinone, dimethylsulfone, diethylsulfone, diisopropylsulfone, and diphenylsulfone.

The amount of the aromatic dihalogenosulfone compound used is usually 95-110 mol %, and preferably 100-105 mol % relative to the aromatic dihydroxy compound. The desired reaction is a dehydrohalogenation polycondensation of the aromatic dihalogenosulfone compound and the aromatic dihydroxy compound. If no side reaction occurs, as the molar ratio of both approaches 1:1—that is, as the amount of the aromatic dihalogenosulfone compound used approaches 100 mol % relative to the aromatic dihydroxy compound—the degree of polymerization of the resulting aromatic polysulfone resin increases. As a result, reduced viscosity tends to increase, Mn tends to increase, and Mw/Mn tends to decrease. However, in reality, a side reaction such as a substitution reaction to a hydroxyl group of a halogeno group or depolymerization occurs due to alkali hydroxide and the like that is produced as a by-product, and the degree of polymerization of the resulting aromatic polysulfone resin decreases due to this side reaction. Therefore, taking into consideration also the degree of this side reaction, it is necessary to adjust the amount of the aromatic dihalogenosulfone compound used so that aromatic polysulfone resin is obtained which has the aforementioned prescribed reduced viscosity, Mn, and Mw/Mn.

The amount of the alkali metal salt of carbonic acid used is usually 95-115 mol % as an alkali metal relative to the hydroxyl group of the aromatic dihydroxy compound, and 100-110 mol % is preferable. If no side reaction occurs, as the desired polycondensation rapidly progresses as the amount of alkali metal salt of carbonic acid used increases, the degree of polymerization of the resulting aromatic polysulfone resin increases. As a result, reduced viscosity tends to increase, Mn tends to increase, and Mw/Mn tends to decrease. However, in reality, occurrence of the same side reaction mentioned above is facilitated as the amount of alkali metal salt of carbonic acid used increases, and the degree of polymerization of the resulting aromatic polysulfone resin decreases due to this side reaction. Therefore, taking into consideration also the degree of this side reaction, it is necessary to adjust the amount of the alkali metal salt of carbonic acid used so that aromatic polysulfone resin is obtained which has the aforementioned prescribed reduced viscosity, Mn, and Mw/Mn.

In a typical method of manufacture of aromatic polysulfone resin, an aromatic polysulfone resin is obtained by: dissolving an aromatic dihalogenosulfone compound and an aromatic dihydroxy compound in an organic polar solvent as a first step; adding an alkali metal salt of carbonic acid to the solution obtained in the first step, and polycondensing the aromatic dihalogenosulfone compound and the aromatic dihydroxy compound as a second step; and removing the unreacted alkali metal salt of carbonic acid, the by-product alkali halide, and the organic polar solvent from the reaction mixture obtained in the second step as a third step.

The dissolution temperature of the first step is usually 40-180° C. Moreover, the polycondensation temperature of the second step is usually 180-400° C. If no side reaction occurs, as the desired polycondensation rapidly progresses as polycondensation temperature increases, the degree of polymerization of the resulting aromatic polysulfone resin increases. As a result, reduced viscosity tends to increase, Mn tends to increase, and Mw/Mn tends to decrease. However, in reality, occurrence of the same side reaction that was mentioned above is facilitated as polycondensation temperature increases, and the degree of polymerization of the resulting aromatic polysulfone resin decreases due to this side reaction. Therefore, taking into consideration also the degree of this side reaction, it is necessary to adjust polycondensation temperature so that aromatic polysulfone resin is obtained which has the aforementioned prescribed reduced viscosity, Mn, and Mw/Mn.

With respect to the polycondensation of the second step, usually, the temperature gradually rises, and the reflux temperature of the organic polar solvent is reached while the by-product water is removed. Thereafter, it is usually advisable to conduct heat retention for a further 1-50 hours, and preferably 10-30 hours. If no side reaction occurs, as the desired polycondensation progresses as polycondensation time lengthens, the degree of polymerization of the resulting aromatic polysulfone resin increases. As a result, reduced viscosity tends to increase, Mn tends to increase, and Mw/Mn tends to decrease. However, in reality, the same side reaction mentioned above also progresses as polycondensation time lengthens, and the degree of polymerization of the resulting aromatic polysulfone resin decreases due to this side reaction. Therefore, taking into consideration also the degree of this side reaction, it is necessary to adjust polycondensation time so that aromatic polysulfone resin is obtained which has the aforementioned prescribed reduced viscosity, Mn, and Mw/Mn.

In the third step, first, a solution can be obtained in which aromatic polysulfone resin is dissolved in organic polar solvent by removing the unreacted alkali metal salt of carbonic acid and the by-product alkali halide from the reaction mixture obtained in the second step by filtration, centrifugation or the like. Next, aromatic polysulfone resin can be obtained from this solution by removing the organic polar solvent. Removal of the organic polar solvent may be conducted by directly distilling the organic polar solvent out of the aforementioned solution, or it may be conducted by mixing the aforementioned solution with a poor solvent of aromatic polysulfone resin, precipitating the aromatic polysulfone resin, and conducting separation by filtration, centrifugation or the like. Examples of the poor solvents of aromatic polysulfone resin include methanol, ethanol, isopropyl alcohol, hexane, heptane, and water. Methanol is preferable, because it is easy to remove.

In the case where an organic polar solvent of comparatively high melting point is used as the polymerization solvent, after subjecting the reaction mixture obtained in the second step to cooling solidification, it is pulverized, and the unreacted alkali metal salt of carbonic acid and the by-product alkali halide are extracted and removed from the obtained powder using water, and the organic polar solvent can also be extracted and removed using a solvent which is not capable of dissolving aromatic polysulfone resin, but which is capable of dissolving an organic polar solvent.

From the standpoint of extraction efficiency and work performance during extraction, the volume average particle size of the aforementioned powder is preferably 200-2000 µm, more preferably 250-1500 µm, and still more preferably 300-1000 µm. If too large, there is the undesirable result that extraction efficiency is poor, and if too small, there is the undesirable result that consolidation occurs during extraction, and that clogging occurs during the filtration and drying that follows extraction.

As the extraction solvent, a mixed solvent of acetone and methanol may be used when, for example, diphenyl sulfone is used as the polymerization solvent. Here, the mixing ratio of acetone and methanol is usually determined based on extraction efficiency and adherence of the aromatic polysulfone resin powder.

In another typical method of producing aromatic polysulfone resin, an aromatic dihydroxy compound and alkali metal salt of carbonic acid are reacted in an organic polar solvent, and the water that is produced as a by-product is removed as a first step; an aromatic dihalagenosulfone compound is added to the reaction mixture obtained in the first step, and polycondensation is conducted as a second step; and the unreacted alkali metal salt of carbonic acid, the by-product alkali halide, and the organic polar solvent are removed from the reaction mixture obtained in the second step in the same manner as above to obtain aromatic polysulfone resin as a third step.

With respect to this alternative method, in the first step, azeotropic dehydration may also be conducted by adding an organic solvent that is azeotropic with water in order to remove the by-product water. Examples of the organic solvent that is azeotropic with water include benzene, chlorobenzene, toluene, methyl isobutyl ketone, hexane, and cyclohexane. The temperature of the azeotropic dehydration is usually 70-200° C.

In this alternative method, the polycondensation temperature of the second step is usually 40-180° C., and it is necessary to adjust polycondensation temperature and polycondensation time taking into account also the degree of side reaction as mentioned above so as to obtain aromatic polysulfone resin which has the aforementioned prescribed reduced viscosity, Mn, and Mw/Mn.

As the aromatic polysulfone resin of the present invention thus obtained is high in toughness, it can be used in various applications, and is particularly suitable as film material, especially in porous membranes.

Film which contains the aromatic polysulfone resin of the present invention may, for example, be flat film, tubular film, or hollow-fiber membrane, and it may also be monolayer film or multilayer film. In the case of multilayer film, it may be a multilayer film which has two or more layers containing only the aromatic polysulfone resin of the present invention, or it may be a multilayer film which has one or more layers containing the aromatic polysulfone resin of the present invention, and one or more other layers.

With respect to manufacture of the film, a known method may be suitably adopted. For example, manufacture of a porous membrane may be conducted by a wet-and-dry method where the aromatic polysulfone resin is dissolved in a solvent, and this solution is extruded into a prescribed form with interposition of an air gap, or by a wet method without interposition of an air gap, and with introduction into a solidification liquid, phase separation, and desolvation. Or it may be conducted by dissolving the aromatic polysulfone resin in a solvent, casting this solution into a base material of prescribed form, immersing it in a solidification liquid, and conducting phase separation and desolvation. In addition, manufacture of a non-porous membrane may be conducted by melting the aromatic polysulfone resin, and extruding it into a prescribed form, or it may be conducted by melting the aromatic polysulfone resin, and casting it into a base material of prescribed form. It may also be conducted by dissolving the aromatic polysulfone resin in a solvent, casting this solution into a base material of prescribed form, and conducting desolvation.

In the case where hollow-fiber membrane is manufactured as the porous membrane, preferably, the aforementioned solution is used as the spinning stock solution, a double-ring nozzle of the core-sheath type is used to discharge the aforementioned solution from the sheath side, while a solidification liquid (hereinafter sometimes referred to as "internal solidification liquid") or gas is discharged from the core side, and these are introduced into a solidification liquid (hereinafter sometimes referred to as "external solidification liquid") with or without interposition of an air gap.

Examples of the good solvent of aromatic polysulfone resin used in preparation of the aforementioned solution (hereinafter sometimes simply referred to as "good solvent") include N-methyl pyrrolidone, N,N-dimethyl formamide, and N,N-dimethyl acetoamide. Particularly in the case where a porous membrane is manufactured, the aforementioned solution may also contain components other than aromatic polyester resin and good solvent—e.g., hydrophilic polymer, poor solvent of aromatic polysulfone resin (hereinafter sometimes simply referred to as "poor solvent"), and lubricants. By having the aforementioned solution contain a hydrophilic polymer, it is possible to obtain a porous membrane which has excellent water permeability, and which is well-suited for use in aqueous fluid filtration such as ultrafiltration and microfiltration. When the aforementioned solution does not contain poor solvent or lubricants, it is preferable that N,N-dimethyl acetoamide be used as good solvent. Examples of lubricants include ethylene glycols such as ethylene glycol, diethylene glycol, and triethylene glycol. Ethylene glycol is preferable due to its ease of removal.

Examples of the hydrophilic polymer include polyalkyleneglycols such as polyvinylpyrrolidone, polyethyleneglycol, and polypropyleneglycol; polyhydroxyalkyl(meth)acrylates such as polyvinyl alcohol, polyhydroxyethyl acrylate, and polyhydroxyethyl methacrylate; polyacrylamide; and polyethylene imine. Two or more of these may be used as necessary. Among these, it is preferable when polyvinyl pyrrolidone—particularly high-molecular-weight polyvinylpyrrolidone with a molecular weight of 1 to 3 million—is used, because even a small amount can increase the viscosity enhancement effect of the aforementioned solution.

The amount of hydrophilic polymer used is usually 5-40 parts by weight, and preferably 15-30 parts by weight, relative to 100 parts by weight of aromatic polysulfone resin. When the amount of hydrophilic polymer used is excessively small, the porous membrane that is obtained has insufficient water permeability, and when it is too large, the porous membrane that is obtained has insufficient heat resistance and chemical resistance, as well as insufficient toughness.

As solidification liquid, poor solvent or mixed solvent of poor solvent and good solvent may be used, but it is preferable when a mixed solvent of poor solvent and good solvent is used as the solidification liquid, because it is possible to adjust pore diameter and pore diameter distribution of the resulting porous membrane by adjusting the mixing ratio thereof. In particular, these effects can be efficiently engendered when using a mixed solvent composed of water which is the poor solvent and N,N-dimethyl acetoamide which is the good solvent as both the internal solidification liquid and the external solidification liquid. By using this mixed solvent, the subsequent solvent recovery can be easily conducted.

When manufacturing a porous membrane which contains a hydrophilic polymer in the aforementioned solution, the resulting porous membrane may be subjected to heat treatment or radiation treatment as necessary in order to perform insolubilization treatment on the hydrophilic polymer in the porous membrane. By conducting heat treatment or radiation treatment, the hydrophilic polymer crosslinks, and fixates within the porous membrane, thereby enabling prevention of elution of the hydrophilic polymer in the filtrate when the porous membrane is used as a filtration membrane.

It is preferable that the heat treatment or radiation treatment be conducted within a scope that does not markedly change the porous membrane in terms of its form, structure, mechanical properties or the like, and under conditions that are sufficient for cross-linking of the hydrophilic polymer. Either treatment may be conducted alone, or both treatments may be conducted.

For example, heat treatment for a porous membrane that is manufactured using polyvinylpyrrolidone as the hydrophilic polymer is preferably conducted at a treatment temperature of 150-190° C., and treatment time is suitably set according to the amount of polyvinylpyrrolidone in the porous membrane.

Radiation treatment of the porous membrane can be conducted using $\alpha$-rays, $\beta$-rays, $\gamma$-rays, X-rays or electron rays as the radiation. In this case, it is possible to effectively prevent damage to the porous membrane by conducting the treatment under conditions where the porous membrane has been impregnated with water containing antioxidants.

Examples of the present invention are shown below, but the present invention is not limited thereto.

EXAMPLES (Measurement of Reduced Viscosity of Aromatic Polysulfone Resin)

Approximately 1 g of aromatic polysulfone resin was dissolved in N,N-dimethyl formamide, with capacity set at 1 dL, and the viscosity ($\eta$) of this solution was measured at 25° C. using an Ostwald-type viscosity tube. The viscosity ($\eta_0$) of the N,N-dimethyl formamide which was the solvent was also measured at 25° C. using an Ostwald-type viscosity tube. The specific viscosity coefficient ($(\eta-\eta_0)/\eta_0$) was obtained from the viscosity ($\eta$) of the aforementioned solution and the viscosity ($\eta_0$) of the aforementioned solvent. The reduced viscosity (dL/g) of the aromatic polysulfone resin was obtained by dividing this specific viscosity coefficient by the concentration of the aforementioned solution (approximately 1 g/dL).

(Measurement of Mn and Mw/Mn of Aromatic Polysulfone Resin)

Gel permeation chromatography (GPC) was conducted under the following conditions to obtain Mn and Mw, and Mw/Mn was calculated (an average value of two analyses).

Sample: charging was conducted with 50 µL of an N,N-dimethyl formamide solution of aromatic polysulfone resin with a concentration of 0.002 g/mL Columns: connection of two of "TSKgel $GMH_{HR}$-H" (7.8 mm φ×300 mm) manufactured by Tosoh Corporation Column temperature: 40° C.
Eluent: N,N-dimethyl formamide
Eluent flow rate: 0.8 mL/minute
Detectors: differential refractive index meter (RI)+light scattering photo meter (LS)
Standard reagent: polystyrene (Evaluation of Toughness of Aromatic Polysulfone Resin)

A sample specimen of 13 cm×1 cm was cut out from an aromatic polysulfone resin film, and a flex test was conducted under the conditions of a bend radius of 0.38 mm and a load of 4.9 N using an MIT fatigue tester (manufactured by Toyo Seiki Co., Ltd.) to obtain the number of times of bending until breakage of the specimen (an average value of 8 times per test).

Example 1

A polymerization tank provided with a condenser equipped with an agitator, a nitrogen inlet tube, a thermometer, and a receiver at its distal end was charged with 500 g of bis(4-hydroxyphenyl) sulfone, 589 g of bis(4-chlorophenyl) sulfone, and 942 g of diphenyl sulfone as the polymerization solvent, and heated to a temperature of 180° C. while circulating nitrogen gas through the system. After adding 287 g of potassium carbonate to the obtained solution, the temperature was gradually raised to 290° C., and reaction was conducted for a further two hours at 290° C. After the obtained reaction solution was cooled to room temperature to be solidified, and was finely pulverized, washing with hot water and washing with a mixed solvent of acetone and methanol were conducted several times, and drying by heating was then conducted at 150° C. to obtain aromatic polysulfone resin terminated by a chloro group as powder. The reduced viscosity, Mn, and Mw/Mn of this aromatic polysulfone resin were measured, and the results are shown in Table 1.

A 500 mL separable flask was charged with 75 g of the aforementioned aromatic polysulfone resin and 225 g of N-methyl-2-pyrrolidone, and was stirred for two hours at 60° C. to obtain an aromatic polysulfone solution of pale yellow color. This solution was cast onto a glass plate (thickness: 3 mm) using a film applicator, and was heated at 60° C. using high-temperature hot-air dryer until its surface was dry, after which it was subjected to heat treatment at 250° C. under a nitrogen atmosphere to form an aromatic polysulfone resin film of 46 µm thickness on the glass plate. Subsequently, the aromatic polysulfone resin film was peeled off from the glass plate to evaluate toughness, and the results are shown in Table 1.

Comparative Example 1

A polymerization tank provided with a condenser equipped with an agitator, a nitrogen inlet tube, a thermometer, and a receiver at its distal end was charged with 500 g of bis(4-hydroxyphenyl) sulfone, 593 g of bis(4-chlorophenyl) sulfone, and 949 g of diphenyl sulfone as the polymerization solvent, and heated to a temperature of 180° C. while circulating nitrogen gas through the system. After adding 287 g of anhydrous potassium carbonate to the obtained solution, the temperature was gradually raised to 290° C., and reaction was conducted for a further two hours at 290° C. After the obtained reaction solution was cooled to room temperature to be solidified, and was finely pulverized, washing with hot water and washing with a mixed solvent of acetone and methanol were conducted several times, and drying by heating was then conducted at 150° C. to obtain aromatic polysulfone resin terminated by a chloro group as powder. The reduced viscosity, Mn, and Mw/Mn of this aromatic polysulfone resin were measured, and the results are shown in Table 1.

Using the aforementioned aromatic polysulfone resin, aromatic polysulfone resin film was obtained in the same manner as Example 1, and its toughness was evaluated. The results are shown in Table 1.

Comparative Example 2

A commercial aromatic polysulfone resin ("Ultrason E6020P" manufactured by BASF Co.) was used. The reduced viscosity, Mn, and Mw/Mn of this aromatic polysulfone resin were measured, and the results are shown in Table 1.

Using the aforementioned aromatic polysulfone resin, aromatic polysulfone resin film was obtained in the same manner as Example 1, and its toughness was evaluated. The results are shown in Table 1.

TABLE 1

| Example | Reduced viscosity (dL/g) | Mn | Mw/Mn | Toughness (Number of flexes) |
|---|---|---|---|---|
| Example 1 | 0.59 | 24000 | 2.47 | 1768 |
| Comparative Example 1 | 0.48 | 19000 | 2.21 | 1214 |
| Comparative Example 2 | 0.6 | 21400 | 2.56 | 1611 |

INDUSTRIAL APPLICABILITY

As the aromatic polysulfone resin of the present invention is high in toughness, it is well-suited for use as film material especially in porous membranes, and therefore has great industrial usefulness.

The invention claimed is:
1. Aromatic polysulfone resin, wherein reduced viscosity is 0.55-0.65 dL/g, number average molecular weight (Mn) is 22000 or more, a value of the ratio (Mw/Mn) of weight average molecular weight (Mw) relative to number average molecular weight (Mn) is 2.54 or less, and a proportion of a repeating unit represented by a formula (1) is 80 to 100 mol %, relative to the total of all repeating units,

$$Ph^1\text{-}SO_2\text{-}Ph^2\text{-}O— \qquad (1)$$

wherein $Ph^1$ and $Ph^2$ each independently represent a phenylene group, and hydrogen atoms of the aforementioned phenylene groups may each be independently substituted with one of an alkyl group, an aryl group, and a halogen atom.

2. Film comprising the aromatic polysulfone resin according to claim 1.

3. The film according to claim 2, which is a porous membrane.

4. The aromatic polysulfone resin according to claim 1, wherein the reduced viscosity is 0.58-0.62 dL/g.

5. The aromatic polysulfone resin according to claim 1, wherein the number average molecular weight (Mn) is 23500 to 27000.

6. The aromatic polysulfone resin according to claim 4, wherein the number average molecular weight (Mn) is 23500 to 27000.

7. Film comprising the aromatic polysulfone resin according to claim 4.

8. Film comprising the aromatic polysulfone resin according to claim 5.

9. Film comprising the aromatic polysulfone resin according to claim 6.

10. The film according to claim 7, which is a porous membrane.

11. The film according to claim 8, which is a porous membrane.

12. The film according to claim 9, which is a porous membrane.

* * * * *